United States Patent
Boothby et al.

(10) Patent No.: US 11,023,867 B2
(45) Date of Patent: Jun. 1, 2021

(54) PUSH PAYMENT SCHEME THROUGH A TRUSTED THIRD PARTY

(71) Applicant: IPCO 2012 LIMITED, London (GB)

(72) Inventors: Robert Boothby, London (GB); Sunil Peenikal, London (GB)

(73) Assignee: IPCO 2012 LIMITED, London (GB)

( * ) Notice: Subject to any disclaimer, the term of this patent is extended or adjusted under 35 U.S.C. 154(b) by 0 days.

(21) Appl. No.: 16/313,763

(22) PCT Filed: Jun. 29, 2017

(86) PCT No.: PCT/GB2017/051904
§ 371 (c)(1),
(2) Date: Dec. 27, 2018

(87) PCT Pub. No.: WO2018/002628
PCT Pub. Date: Jan. 4, 2018

(65) Prior Publication Data
US 2019/0228390 A1 Jul. 25, 2019

(30) Foreign Application Priority Data
Jun. 30, 2016 (GB) ..................................... 1611472

(51) Int. Cl.
*G06Q 20/02* (2012.01)
*G06F 21/31* (2013.01)
(Continued)

(52) U.S. Cl.
CPC .......... *G06Q 20/085* (2013.01); *G06Q 20/32* (2013.01); *G06Q 20/385* (2013.01); *G06Q 20/40* (2013.01); *G06Q 20/425* (2013.01)

(58) Field of Classification Search
CPC ........................... G06Q 20/385; G06Q 20/425
(Continued)

(56) References Cited

U.S. PATENT DOCUMENTS

| 7,716,129 B1* | 5/2010 | Tan | ........................ G06Q 20/32 |
| | | | 705/40 |
| 2010/0174620 A1* | 7/2010 | Stringfellow | ........ G06Q 20/227 |
| | | | 705/26.1 |

(Continued)

FOREIGN PATENT DOCUMENTS

| GB | 2523101 A | 8/2015 |
| WO | 2009072977 A1 | 6/2009 |

OTHER PUBLICATIONS

PCT International Search Report and Written Opinion, Application No. PCT/GB2017/051904, dated Sep. 4, 2017, 13 pps.

*Primary Examiner* — Hai Tran
(74) *Attorney, Agent, or Firm* — Armstrong Teasdale LLP

(57) ABSTRACT

Provided herein is a method of facilitating a transaction between a payer and a payee using a push payment. The payee sends a request for a payment identification code to a payment agent with payment information. The payment agent generates a unique payment identification code and stores the code along with the associated payment information, and sends the payment identification code to the payee who provides the code to the payer. The payer sends the payment identification code to a financial institution that forwards the code to the payment agent, which uses the code to retrieve the previously stored payment information, and sends the information to the financial institution who forwards the information to the payer. The payer may review information and send a request to pay message including the code to the financial institution, which then arranges for a push payment from the payer to the payee.

15 Claims, 10 Drawing Sheets

(51) Int. Cl.
*G06Q 20/08* (2012.01)
*G06Q 20/38* (2012.01)
*G06Q 20/42* (2012.01)
*G06Q 20/32* (2012.01)
*G06Q 20/40* (2012.01)

(58) Field of Classification Search
USPC .......................................................... 705/44
See application file for complete search history.

(56) References Cited

U.S. PATENT DOCUMENTS

| | | | |
|---|---|---|---|
| 2011/0251910 A1* | 10/2011 | Dimmick | G06Q 20/322 |
| | | | 705/17 |
| 2014/0214675 A1* | 7/2014 | Sharma | G06Q 20/10 |
| | | | 705/44 |
| 2014/0244506 A1* | 8/2014 | Gramling | G06Q 20/401 |
| | | | 705/44 |

* cited by examiner

PUSH PAYMENT SCHEME THROUGH A TRUSTED THIRD PARTY

CROSS-REFERENCE TO RELATED APPLICATIONS

This patent application is a National Stage Entry of PCT/GB2017/051904 filed on Jun. 29, 2017, which claims the benefit and priority of Great Britain Patent Application No. 1611472.0 filed on Jun. 30, 2016, the disclosures of which are incorporated herein by reference in their entirety as part of the present application.

BACKGROUND

The present disclosure relates to a method of facilitating an electronic push payment message within a tokenized payment transaction scheme.

There are known disadvantages to making online payments, for example during internet shopping. Most of these disadvantages result from security risks associated with making online payments. For example, a consumer is required to enter sensitive financial information into a computer for submission across the internet, which exposes the consumer to well-known risks of having that sensitive financial information stolen and used fraudulently.

Tokenized transaction schemes have been proposed to address such concerns. These schemes have the advantage of allowing a transaction to be arranged without the need for a consumer to share their sensitive financial information with a merchant. Instead, the transaction is arranged using a trusted third party.

For example, when making a purchase, a consumer may want to pay using a tokenized payment scheme. The consumer may request a token or code from a trusted third party, namely a payment agent. This may be done from a merchant website or from a mobile computing device app or other software provided on one of the consumer's computing devices. The payment agent generates a code, saves the consumer's details against the code, and sends the code to the consumer. The consumer then provides the code to the merchant, for example by entering the code on a payment page on the merchant's website. The merchant then sends a request for payment to the payment agent that includes transaction details (for example, quantity of goods ordered, price and date and time of sale), along with the code signifying the details of the consumer. The payment agent uses the code to retrieve the consumer's details, and then sends the transaction details to the consumer for the consumer to authorize the payment. The consumer may view the transaction details, for example on one of the consumer's computing devices. If authorized, the consumer sends a positive response to the payment agent that authorizes the transaction. The payment agent may then arrange for a payment to be made to the merchant in accordance with the merchant's original request for payment. The payment agent may notify the consumer and merchant that the transaction has been arranged such that the merchant may release the goods or services to the consumer. At no time during the transaction is the consumer's sensitive financial information passed to the merchant. WO2009/072977 describes a prior art tokenized payment scheme like this.

BRIEF DESCRIPTION

A first aspect of the present disclosure provides a computer-implemented method of facilitating a transaction between a payer and a payee using a push payment.

The method includes (i) a computing apparatus associated with a payee (also described as the payee's computing apparatus and the computing apparatus of the payee herein) sending a request for a payment identification code to computing apparatus of a payment agent (also described as payment agent's computing apparatus herein). The request may be sent by computing apparatus of the payee or it may be sent by computing apparatus of one or more agents ("distributors"), wherein the distributor is associated with the payee for collecting payments due to the payee. The request for a payment identification code includes payment information identifying the payee and the amount to be paid, and may optionally identify the distributor.

The request may be initiated by the distributor, for example where the payer is a consumer and is shopping on a website, checks out and is directed to a payment page (or even a payment frame set within a webpage) that is hosted by the distributor. Alternatively, the method may further include an initial step of computing apparatus of the payee sending the request for a payment identification code to the distributor's computing apparatus, wherein the request for a payment identification code includes payment information identifying the payee and the amount to be paid. In this case, the distributor's computing apparatus may forward the request to the payment agent.

In any case, the first communication from the payee side of the transaction is not a request for a pull payment, as is the case in prior art systems. According to the present disclosure, the payee or distributor merely requests a payment identification code from a payment agent. To allow the payment agent to arrange the transaction, the payee provides payment information including a payee identifier and the amount to be paid and, optionally, an identifier of the distributor. This allows the payment agent to provide this information to the payer later such that the payer may check and authorize the payment. It also allows a push payment to be made from the payer to the payee (or to a distributor of the payee) as the payment amount and the payee (and optionally the distributor) are identified.

Next, the method includes (ii) the payment agent's computing apparatus generating a payment identification code to be associated with the payment information that is unique thereby allowing the payment to be unambiguously identified, and storing the payment identification code with the associated payment information. The payment agent's computing apparatus may also store an indication of the distributor, optionally including an indication of whether the payment associated with the transaction should be made to the distributor or to the payee. The payment agent's computing apparatus may also provide the payment identification code to the computing apparatus associated with the payee that requested the code (for example, to either the payee's computing apparatus or the distributor's computing apparatus which may forward the code to the payee's computing apparatus). Thus, the payee or distributor is now in possession of a unique code identifying the transaction that may be provided to the payer such that the payer may identify independently the transaction to the payment agent.

Hence, the method further includes (iii) the computing apparatus associated with the payee providing the payer with the payment identification code. For example, for in-store purchases, the payee may inform the payer of the code directly, either verbally or by displaying the code, for example on a till display.

So, the method further includes (iv) the payer's computing apparatus receiving the payment identification code from the computing apparatus associated with the payee either directly or indirectly via input by the payer, whether manual or by another communication method. The method then includes (v) the payer's computing apparatus sending the payment identification code to a computing apparatus of a financial institution (also described as the financial institution's computing apparatus herein). The financial institution is a financial institution associated with the payer for making payments from the payer. For example, the financial institution may be a bank or building society that holds accounts for the payer.

The method then includes (vi) the financial institution's computing apparatus sending the payment identification code to the payment agent's computing apparatus. Optionally, the financial institution's computing apparatus may store the payment identification code with an indication of the payer from whom it was received.

At step (vii) of the method, upon receiving the payment identification code, the payment agent's computing apparatus uses the payment identification code to retrieve the previously stored payment information associated with the payment identification code. This may include the indication of whether payment is to be made to the distributor or to the payee. The payment agent's computing apparatus then sends the payment information associated with the payment identification code to the financial institution's computing apparatus. This payment information may be sent with or without the payment identification code.

Next, the financial institution's computing apparatus may use the received payment identification code to retrieve the payer identification. The financial institution's computing apparatus may store all or at least some of the payment information associated with the payment identification code. This may include the indication of whether payment is to be made to the distributor or to the payee. The method then includes (viii) the financial institution's computing apparatus sending the payment information and the payment identification code to the payer's computing apparatus. Next, the method includes (ix) the payer's computing apparatus displaying the payment information received for authorization by the payer. For example, the payer's computing apparatus may display the payee identifier and the amount of the payment. Optionally, the payment information may include details about the items purchased, for example a short description of each item and the cost of each item, in which case this information may also be displayed.

The method then continues at (ix) when the payer's computing apparatus receives an authorization from the user, and responds by sending a request to pay message including the payment identification code to the financial institution's computing apparatus. In contrast to the prior art, this request is a request initiated by the payer and sent to the financial institution associated with the payer to make a push payment to the payee. The method then includes (x) the financial institution's computing apparatus arranging a push payment from the payer to the payee, either directly to the payee or indirectly by arranging a push payment from the payer to the distributor. To where the payment is pushed may be determined by the indication of whether the payment should be made to the payee or the distributor previously sent and stored at step (vii). The payment may be effected through a pre-agreed payment mechanism, for example as a UK faster payment.

The payment identification code may contain no cryptographic representation of details of the payee or the payer. Moreover, the payment identification code may be live for only a short period of time. For example, the code may be time stamped and may expire after a predetermined period of time has elapsed. In essence, the payment identification code is just a blind proxy to the goods or services being purchased, and so theft or compromise of the code provides no threat to either the payer or the payee. If someone steals or intercepts the payment identification code, they would have to use the code with a financial institution (either their own or another one they have compromised) before the payer uses the code, and then all the potential fraudster can do is to purchase the goods or services with their own money. Hence, the payer and payee are not adversely affected.

The present disclosure, as described above, provides enhanced security relative to the pull payment schemes of the prior art. The payment according to the present disclosure remains within the control of the payer and the financial institution associated with the payer. No requests for a pull payment are made. This leads to enhanced security as only the payer's financial institution has knowledge of the payer's financial information (for example bank account numbers). In addition, the payment request falls easily into established payment authorization and security controls, for example, anti-money laundering and other financial controls.

The method allows additional benefits not present in prior art pull payment systems. These include but are not limited to the following additional security benefits. Firstly, the method ensures that the payer is the necessary element authorizing the payment. This may be contrasted with prior art schemes where authorization is given in advance of taking a pull payment that pulls money from an account the payer controls and which may enable many payments to be made. This is an inherent feature of pull payments used in prior art systems. A consequence is that the payer must rely on the payment agent to cancel or revoke such permissions when the payer decides to cancel the ability of the payment agent to pull such payments. The push payment system described by this method relies on an authorization for each transaction to be made as a push payment, and this authorization is provided by the payer in real-time before the payment is made. Such authorization may include two-factor authentication and/or secure encryption channels. Additionally, it allows the payer to review and check the transaction details, including the transaction amount and the payee's identity, before the payment is made. The payer will see the payee's identity, and this is provided by the payment agent and is not provided directly by the payee. This eliminates a number of spoofing/interception type attacks to which current card based payment systems are vulnerable.

The payment identification code may vary according to need. For example, the length of the payment identification code may be varied. There may be conflicting interests affecting how the length of the payment identification code is set. In general, the longer the payment identification code, the more secure the code will be. However, the longer the payment identification code, the more onerous it may be to pass this information between the parties to the transaction. How these conflicting requirements balance is also affected by how the payment identification code is passed between parties, i.e. whether it is passed automatically or whether it requires the intervention of a user such as the payer.

For example, for in-store purchases, the payee may inform the payer of the payment identification code, either verbally or by displaying the code, for example on a till display. In this case, the payer may type the code into the payer's computing apparatus. In this example, typing a long code will be onerous, so it is better to use a short code. Hence, optionally, the payment identification code may be short, for example six characters or fewer, or four characters or fewer. The request for a payment identification code made in step (i) may be a request for a short payment identification code, for example when it is known that the payer must enter the code manually. Then, step (ii) may include the payment agent's computing apparatus generating a short payment identification code to be associated with the payment information.

Where the transaction is part of internet shopping, the distributor or payee may be able to pass the code automatically to the payer's computing apparatus. In these cases, the payer need not enter the code manually and so a long code may be used, for example a code of greater than six characters may be used. In other cases, it may not be possible to pass the code automatically to the payer's computing apparatus, for example where the payer is shopping using computing apparatus such as a desktop computer but who will arrange the payment using a different computing apparatus, for example a smart phone or tablet device running a payment app. In these cases, a short code may be used to make manual entry more convenient for the payer, for example a code of six characters or fewer, or four characters or fewer.

As the payment is a push payment, the payer may decline to make the transaction at this time. For example, the payer may decline to proceed with the transaction if the payer doubts the authenticity of the code provided by the distributor or payee (as may be the case if the code is illegible or looks as if it has been altered).

The above methods describe situations where the payee requests the payment identification code, but the disclosure may also be practiced in methods where the payer requests the payment identification code and then passes the received payment identification code to the payee.

Hence, in a second aspect, the present disclosure provides a computer-implemented method of facilitating a transaction between a payer and a payee using a push payment. The method includes the following steps.

(a) A computing apparatus associated with a payer sending a request for a payment identification code to computing apparatus of a financial institution, wherein the financial institution is a financial institution associated with the payer for making payments from the payer.

(b) The financial institution's computing apparatus sending a request for a payment identification code to computing apparatus of a payment agent.

(c) The payment agent's computing apparatus generating a payment identification code that is unique thereby allowing the payment to be unambiguously identified, storing the payment identification code with an indication of the requesting financial institution, and providing the payment identification code to the financial institution's computing apparatus.

(d) The financial institution's computing apparatus sending the payment identification code to the payer's computing apparatus. Optionally, the financial institution's computing apparatus may store the payment identification code with an indication of the payer who requested the payment identification code.

(e) The payer providing the payee with the payment identification code. This may be done verbally.

(f) A computing apparatus of the payee receiving the payment identification code. This may be done by the code being entered manually, for example by being typed by the payer or the payee.

(g) The payee's computing apparatus sending the payment identification code and payment information identifying the payee and the amount to be paid to the payment agent's computing apparatus.

(h) The payment agent's apparatus storing the payment information with the payment identification code, using the payment identification code to retrieve the previously stored indication of the requesting financial institution, and sending the payment information associated with the payment identification code to the financial institution's computing apparatus.

Now that the payment identification code has been exchanged between the payer and the payee, and the payment information associated with the payment identification code has been acquired by the financial institution, we are a similar stage in the transaction as for the end of step (vii) of the first aspect of the present disclosure. Hence, the following steps are the same as for the first aspect of the present disclosure, and so common numbering of steps (viii) to (x) is used.

Thus, the method according to the second aspect further also includes the following steps.

(viii) The financial institution's computing apparatus sending the payment information and the payment identification code to the payer's computing apparatus.

(ix) The payer's computing apparatus displaying the payment information for authorization by the payer, receiving an authorization from the payer, and sending a request to pay message including the payment identification code to the financial institution's computing apparatus.

(x) The financial institution's computing apparatus arranging for a push payment from the payer to the payee.

Further optional features that are applicable to both the first and second aspects of the present disclosure will now be described.

Optionally, step (viii) further includes the financial institution's computing apparatus updating the stored payment identification code with the payment information thereby associating the payment information with the payment identification code. This may include the indication of whether payment is to be made to the payee or to a distributor. Then, at step (x), the financial institution's computing apparatus may use the payment identification code received from the payer's computing apparatus to retrieve the previously stored payment information, and may arrange for the push payment to the payee or to the distributor to cover the payment amount, wherein the payee/distributor and payment amount are determined from the retrieved payment information. This removes the need for the payer's computing apparatus to send the payment information back to the financial institution's computing apparatus when authorizing the payment.

Alternatively, step (ix) may include the payer's computing apparatus sending a request to pay message including the payment identification code and the transaction details to the financial institution's computing apparatus. Then, step (x) may further include the financial institution's computing apparatus arranging for a push payment from the payer to the payee or distributor identified in the payment information received from the payer's computing apparatus to cover the amount to be paid indicated in the received payment information.

Optionally, the method may further include step (xi) of sending a payment confirmation message to the payer's computing apparatus. This message may be sent from the financial institution's computing apparatus. The payer's computing apparatus may display a confirmation that the payment has been made as step (xii). The confirmation displayed may include the payment information to allow transaction details to be displayed. The payment information may be sent with or as part of the payment confirmation message.

Optionally, the method may include (xiii) sending a payment confirmation message to the computing apparatus associated with the payee that requested the code in step (i). The payment confirmation message may identify the payee and may include the payment information. This may be done directly or indirectly. For example, the message may include an identifier of the payee or it may include the payment identification code to allow the distributor's computing apparatus to retrieve the payee's identification details that were previously associated and saved with the payment identification code. Optionally, where the payment confirmation message is sent to the distributor's computing apparatus, the method may further include (xiv) the distributor's computing apparatus sending a payment confirmation message to the payee's computing apparatus. This payment confirmation message may include the payment identification code to allow the payee's computing apparatus to identify the transaction. For example, the payee may be a large business with many transactions occurring concurrently. This allows the message to be routed to the correct location, for example a store or a point of sale terminal within the store. The method may further include (xv) the payee's computing apparatus displaying a confirmation that the payment has been made.

Optionally, the payer's computing apparatus receiving the authorization from the payer of step (ix) includes the payer's computing apparatus receiving a PIN, password or biometric input to authorize the transaction. For example, the payer's computing apparatus may display the payment information for authorization by the payer who then authorizes the transaction by entering a PIN, password or inputting biometric information such as performing a fingerprint or retina scan. Alternatively, step (ix) may include the payer's computing apparatus receiving the payment information, launching an app on the payer's computing apparatus that requires the payer to log into the app, and the app causing the payer's computing apparatus to display the payment information for authorization by the payer. The payer may log into the app by providing a PIN or password or by inputting biometric information. Such use of two-factor authentication further enhances the secure nature of the present disclosure as all transactions require two factors (i.e. the payment identification code and the payer's PIN or password or biometric information).

The present disclosure also provides a computer programmed to execute any of the methods described above. For example, the computer may include memory having stored therein a computer program including instructions that, when executed, cause the computer to perform any of the methods described above. The present disclosure also provides a computer program including instructions that, when executed, cause a computer to perform any of the methods described above, and in a computer program product having stored thereon such a computer program.

BRIEF DESCRIPTION OF THE DRAWINGS

In order that the present disclosure may be more readily understood, example embodiments will now be described, by way of example only, with reference to the accompanying drawings in which.

DETAILED DESCRIPTION

Figure 1:
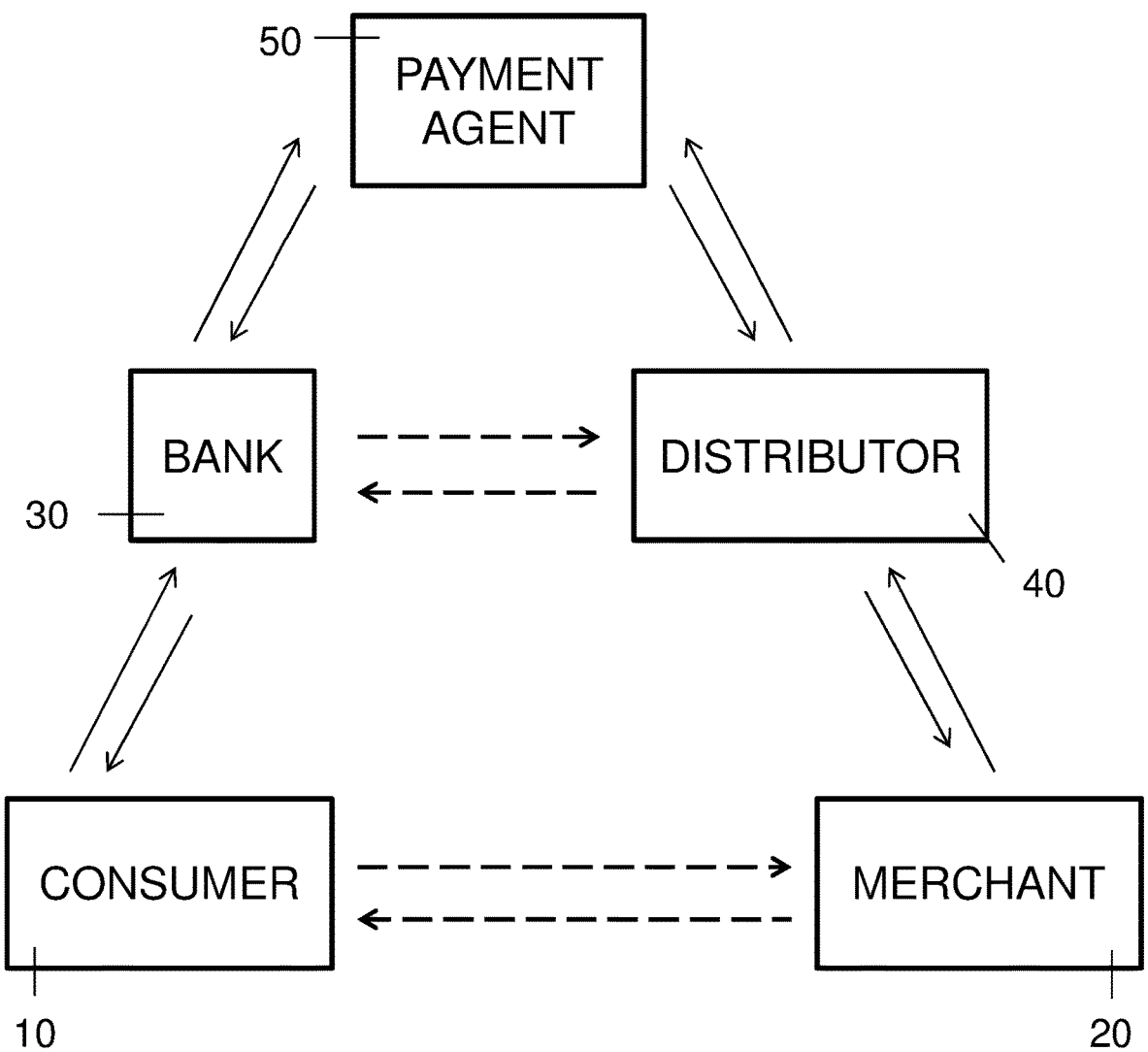
FIG. 1 is a schematic representation of the parties to a tokenized transaction.
Figure 2:
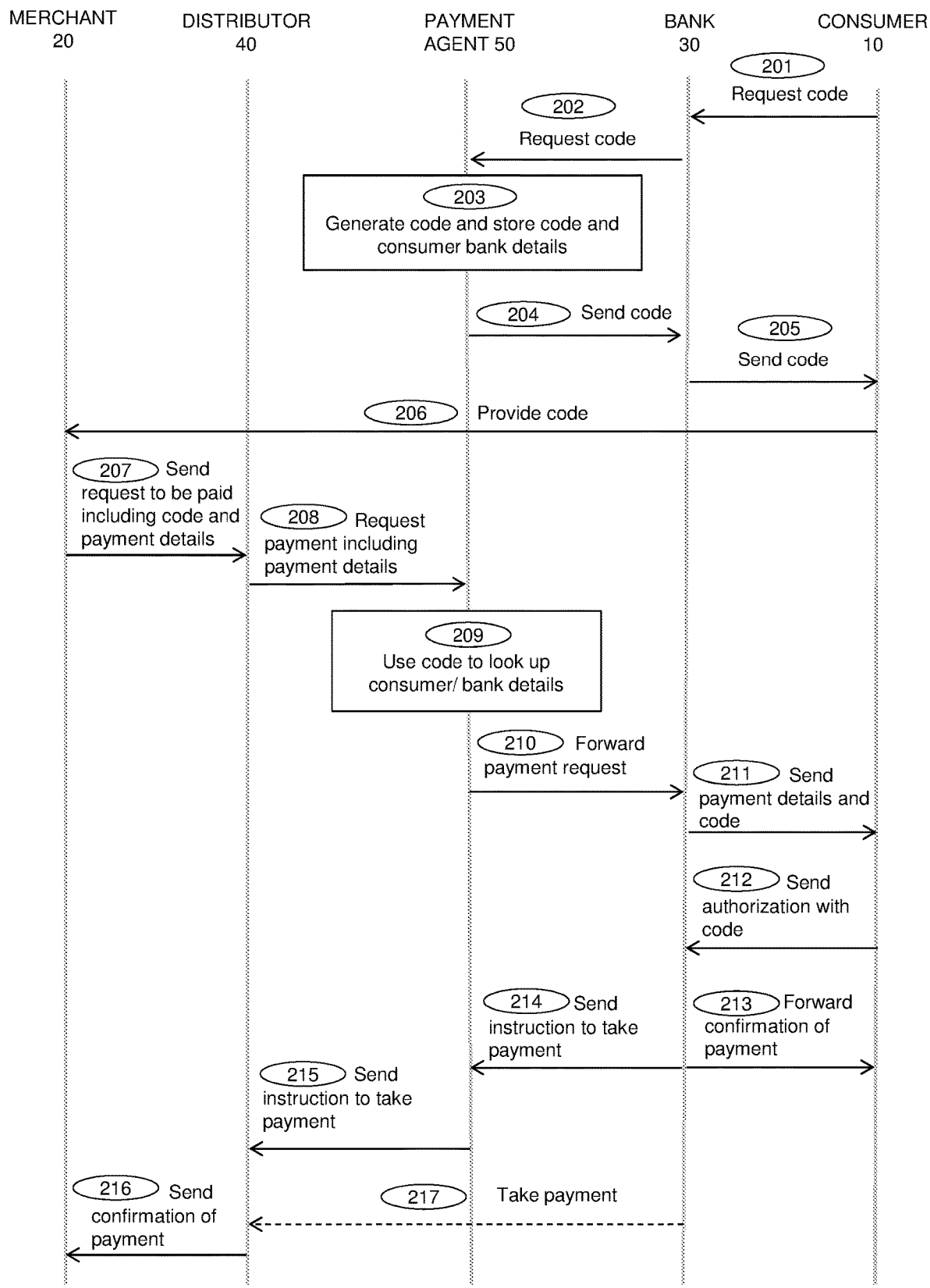
FIG. 2 is a schematic representation of the messages sent during a tokenized transaction according to the prior art.

FIGS. 1 and 2 show a known tokenized "pull" payment transaction scheme. FIG. 1 shows the parties involved in such a tokenized transaction. In this embodiment, the payer is a consumer 10 who wishes to purchase goods or services from a merchant 20 who corresponds to a payee. The consumer 10 has an associated bank 30 or other financial institution that arranges for payments to be made by the consumer 10, and the merchant 20 has an associated distributor 40 who accepts payments on behalf of the merchant 20. The distributor 40 may be a financial institution such as a bank, or may have an association with a financial institution such as a bank that handles accounts on behalf of the distributor. There is also a payment agent 50 that acts as the trusted third party between the consumer 10 and the merchant 20. Other parties may be present in the scheme, for example other intermediaries or regulatory bodies.

The arrows in FIG. 1 show schematically how the parties may communicate with each other. The consumer 10 communicates with his or her bank 30, the bank 30 communicates with the payment agent 50, the payment agent 50 communicates with the distributor 40, and the distributor 40 communicates with the merchant 20. The consumer 10 and merchant 20 may also communicate directly with each other, for example when the consumer 10 is shopping on the merchant's website. The consumer's bank 30 may also communicate with the distributor 40 to make a requested payment.

FIG. 2 shows the messages sent as the transaction is conducted. FIG. 2 starts from the point where the consumer 10 has finished shopping and wishes to make a payment. This may correspond to when a consumer 10 has finished browsing on a merchant's website and has 'proceeded to checkout'. As the consumer 10 wishes to pay using a prior art tokenized "pull" payment transaction scheme, as a first step, the consumer 10 requests a token, namely a payment code, from their bank 30, as shown at 201. At 202, the consumer's bank 30 forwards this request for a payment code to the payment agent 50. At 203, the payment agent 50 generates a payment code and stores the payment code along with details that identify the consumer 10 and/or the bank 30. At 204, the payment agent 50 sends the payment code to the bank 30 and, at 205, the bank 30 forwards the payment code to the consumer 10.

The consumer 10 will then provide the payment code to the merchant 20 at 206. This may be done by typing the payment code into an associated text-entry field provided on the merchant's website, for example provided on a payment page. In response, the merchant 20 prepares a request for a pull payment that includes payment details such as the transaction amount and an identifier of the merchant 20. This request for a pull payment is sent with the payment code to the distributor 40 at 207. At 208, the distributor 40 sends the request for a pull payment including the payment code and payment details to the payment agent 50. At 209, the payment agent 50 looks up the payment code and retrieves the details that identify the consumer 10 and/or bank 30 associated with that payment code. The payment agent 50 then sends the request for a pull payment including the payment code and payment details to the bank 30 at 210, and the bank 30 then sends the payment details and the payment code to the consumer 10 at 211.

The consumer 10 may then view the payment details, for example the transaction amount and the merchant requesting the payment and, once satisfied that the payment request is genuine, may send an authorization at 212 to the bank 30 that allows the requested pull payment to be made. The bank 30 may then separately authorize the transaction, for example after a check has been made that the account selected by the consumer 10 has sufficient funds. Once authorized by the bank 30, the bank 30 sends a confirmation at 213 that the payment has been authorized to the consumer 10 and sends an instruction at 214 to take the payment to the payment agent 50 for forwarding to the distributor 40. At 215, the payment agent 50 duly forwards the instruction to the distributor 40.

At 216, the distributor 40 sends a confirmation to the merchant 20 that the payment has been authorized such that the merchant 20 can release the goods or services. As shown schematically at 217, the distributor 40 may then pull the payment from the consumer's bank 30. This may be done immediately or the payment may be taken at a later time, for example at the end of the day.

Figure 3:
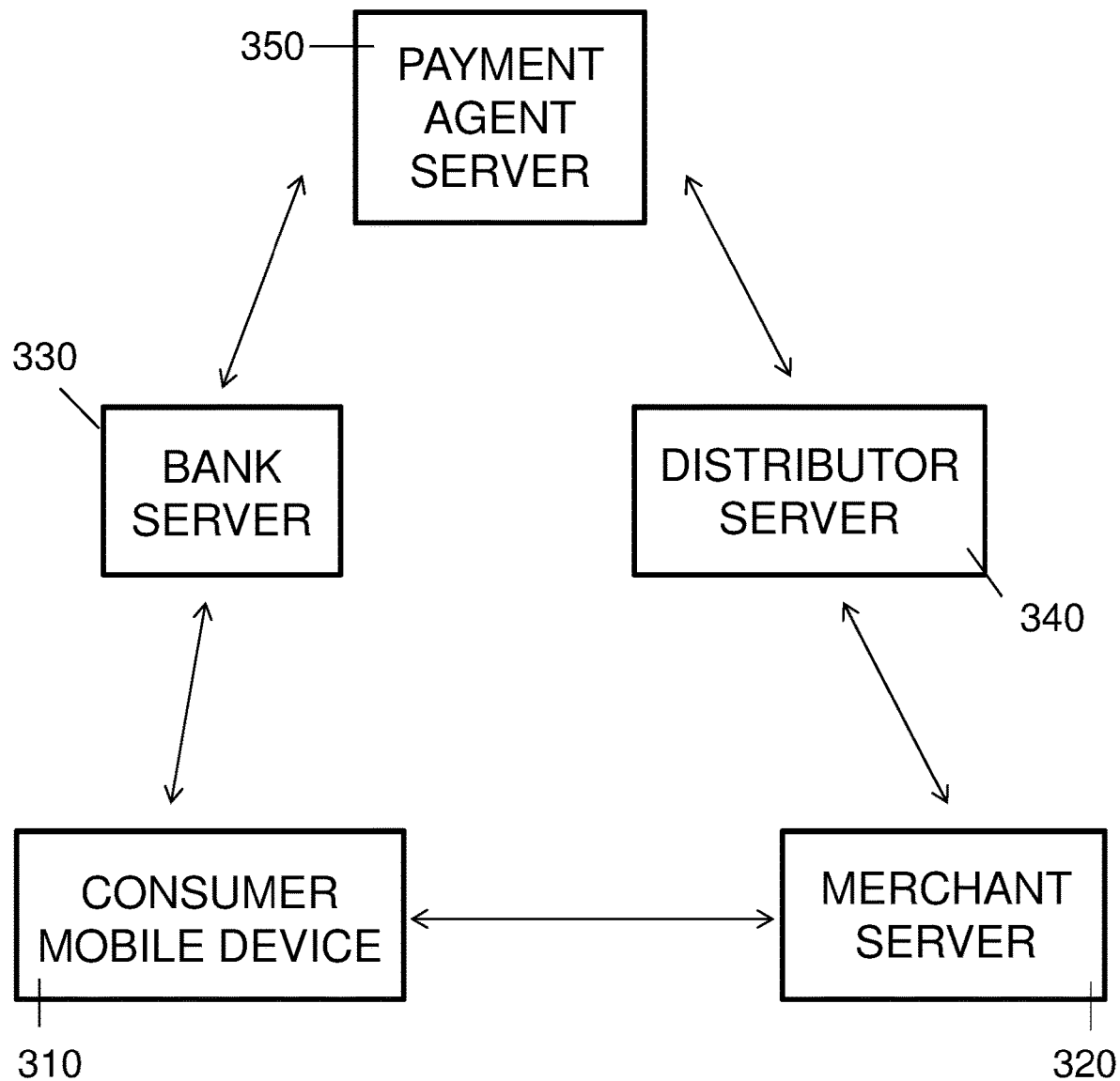
FIG. 3 is a schematic representation of devices participating in a tokenized transaction according to an embodiment of the present disclosure.

FIG. 3 shows an arrangement of devices participating in a tokenized transaction according to a first embodiment of the present disclosure. FIG. 3 has similarities to FIG. 1, but shows the computing devices participating in a tokenized transaction. In this example, a consumer 10 is shopping on a mobile computing device 310 such as a tablet or smart phone. The consumer 10 is shopping on a merchant's website provided by the merchant's server 320. The consumer's bank 30 has a bank server 330, the distributor 40 has a distributor server 340, and the payment agent 50 has a payment agent server 350.

Figure 4:
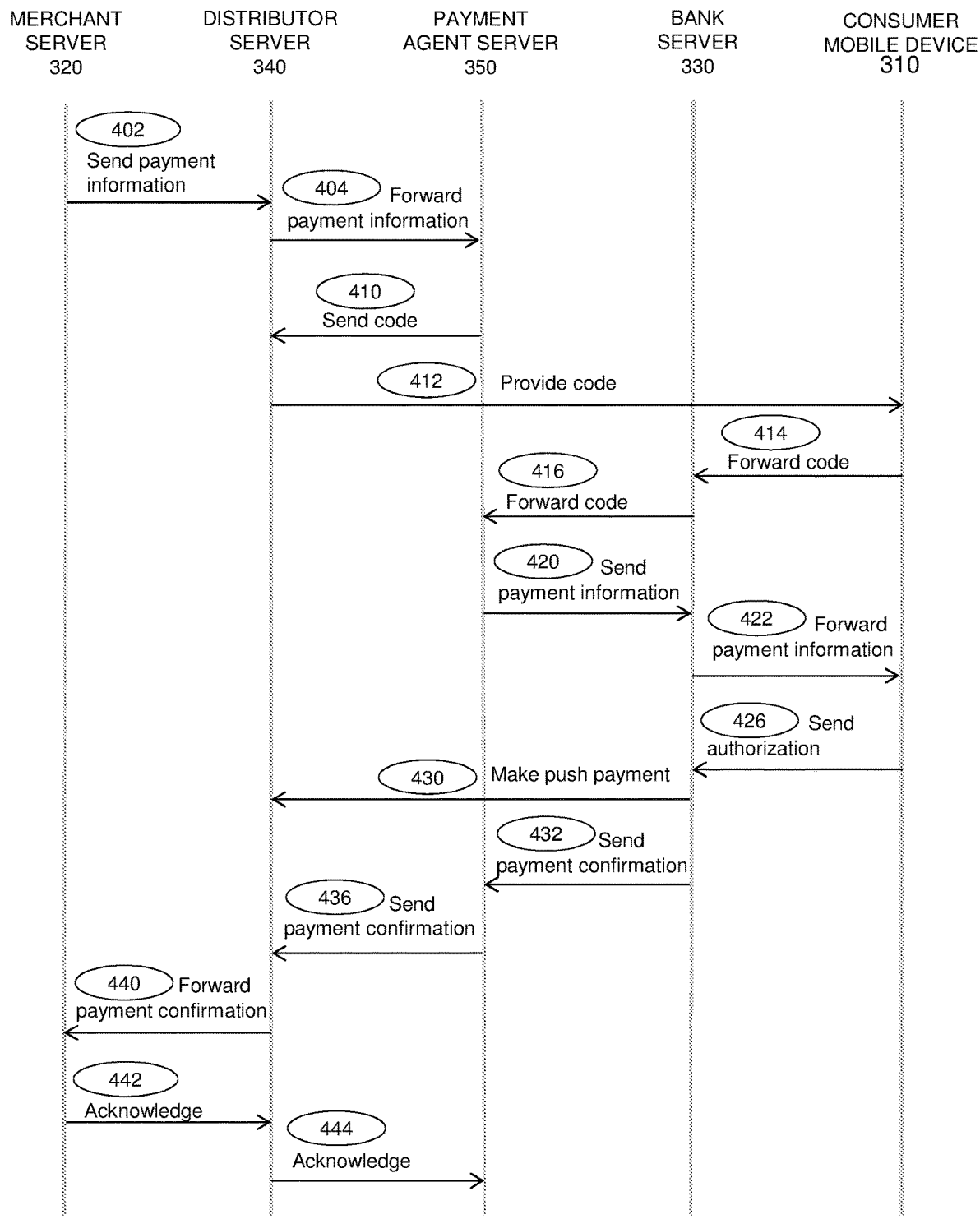
FIG. 4 is a schematic representation of the messages sent during a tokenized transaction according to an embodiment of the present disclosure.
Figure 5A:
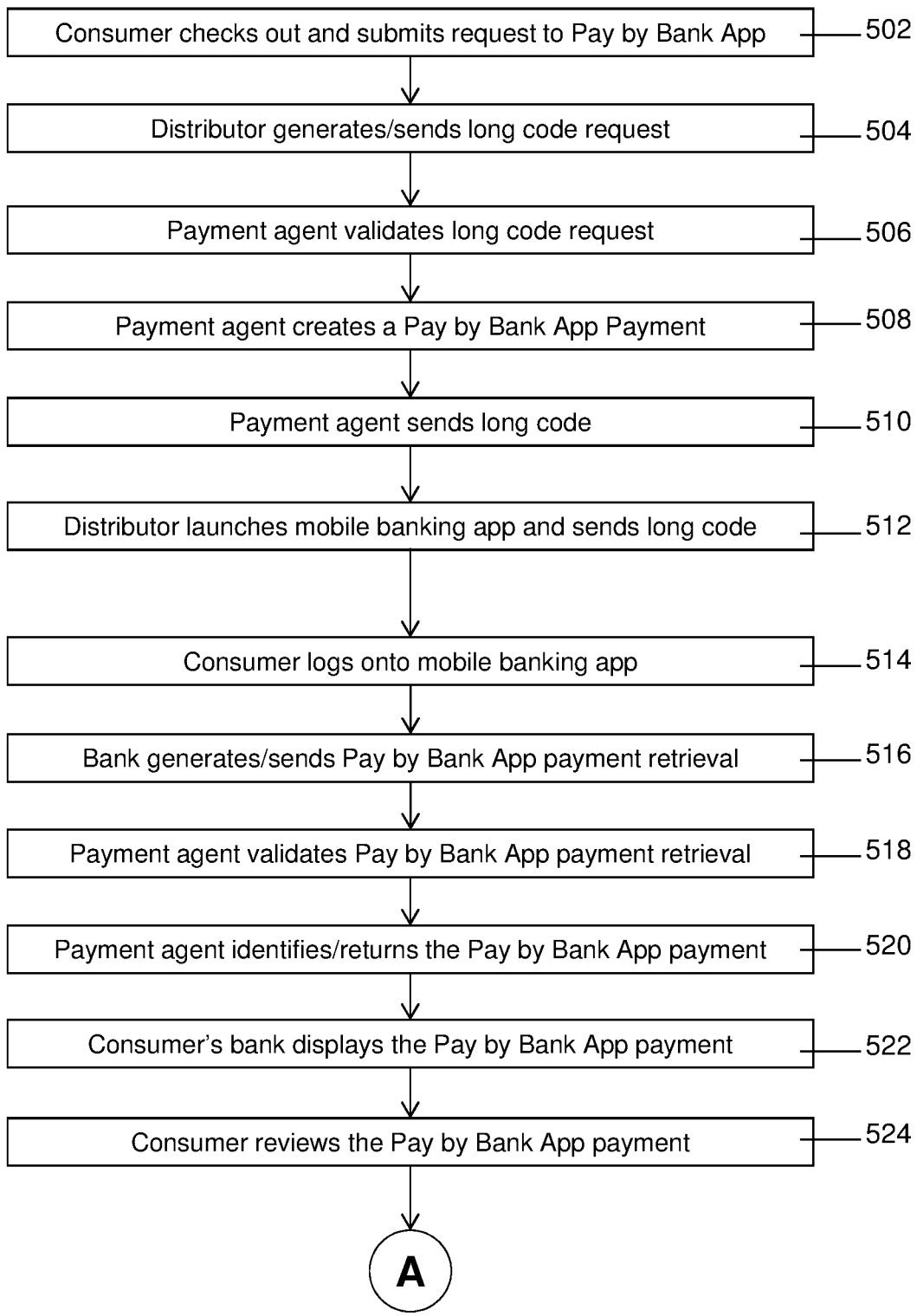
FIGS. 5A and 5B are is a schematic representation of the steps in the tokenized transaction of FIG. 4.
Figure 5B:
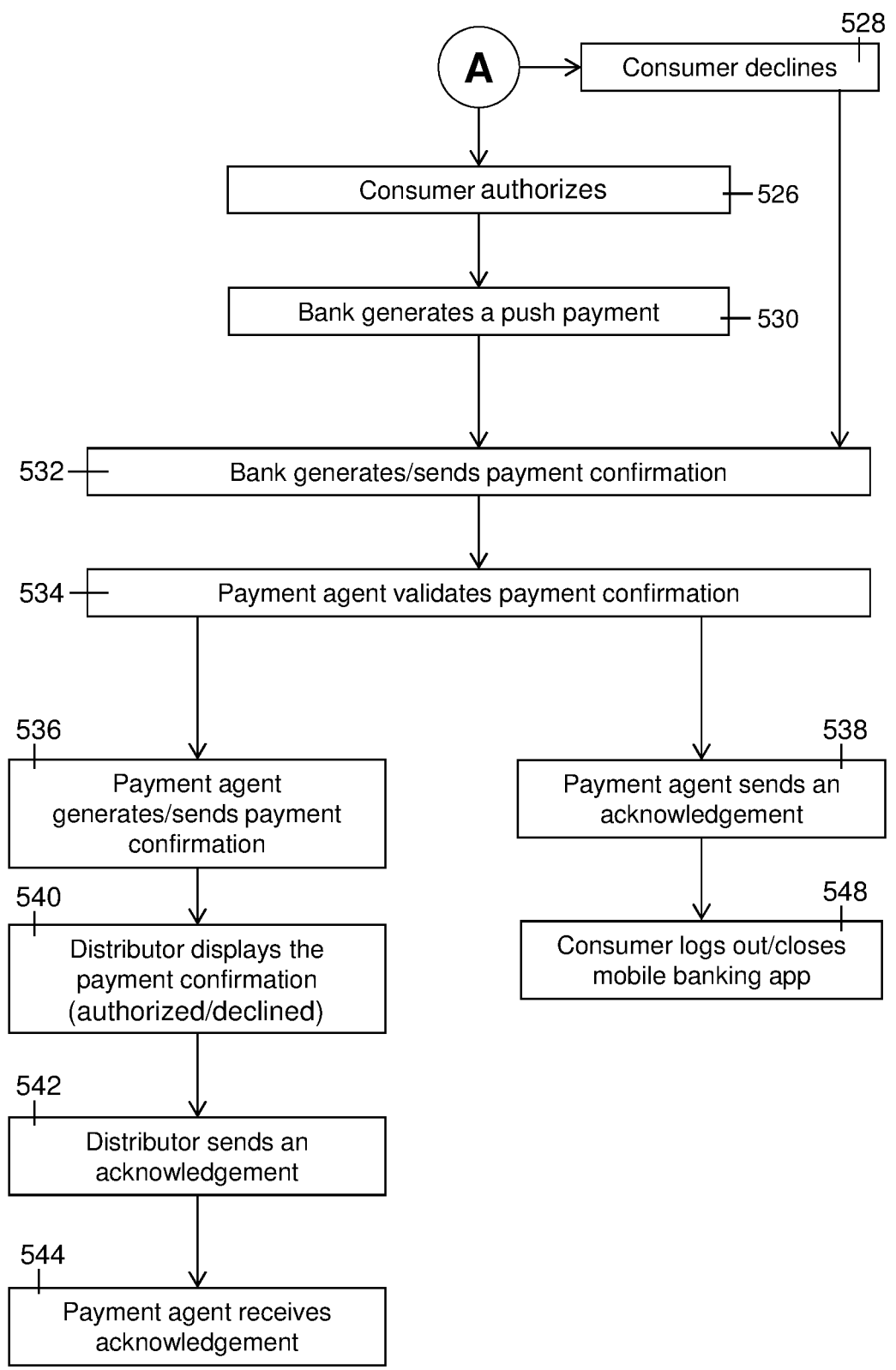

FIGS. 5A and 5B show the steps performed in the tokenized transaction scheme of the first embodiment of the present disclosure, and FIG. 4 shows the messages sent as the method is performed.

At 502, the consumer 10 has completed their shopping on the merchant's website and so proceeds to a checkout webpage. This webpage is provided by the distributor server 340. To allow payment to be taken, the merchant server 320 provides the transaction details to the distributor server 340 at 402. The transaction details include a merchant identifier and the transaction total and, optionally, a description of the items being purchased. As implemented, the disclosure provides the checkout webpage with a "Pay By Bank App®" button which allows the consumer 10 to indicate that they wish to pay using the Pay By Bank App® tokenized transaction scheme. Of course, the present disclosure may be used with other tokenized transaction schemes. The consumer 10 selects this button, which causes the method to proceed to step 504.

At step 504, the distributor server 340 forwards all or some of the transaction details to the payment agent server 350 as part of a request for a long payment code, shown at 404. The request for the long payment code may be initiated by the merchant 20 which will be forwarded by the distributor server 340. Hence, this is a merchant initiated tokenized transaction scheme in that it is the merchant 20 (via the distributor 40) who initiates the tokenized transaction by requesting a payment code from the payment agent 50. Although the distributor server 340 sends transaction details, this is accompanied by a request for a long payment code and is not a request for payment as would be made when requesting a pull payment.

Upon receiving the request for a payment code 404, the payment agent server 350 validates the request as shown at 506 by checking that the merchant 20 is registered with the payment agent 50. If the merchant 20 is successfully validated, the payment agent server 350 generates a Pay By Bank App® payment at step 508. That is, the payment agent server 350 generates a long payment code and stores it in memory along with the transaction details that were sent with message 404. Then, at step 510, the payment agent server 350 sends the long payment code as message 410 to the distributor server 340.

The distributor server 340 then, through the checkout webpage it provides, runs a script to launch a mobile banking app stored on the consumer's mobile device 310, as shown at 512. Alternatively, the merchant 20 may launch the banking app, through its website or, if the consumer 10 is using a merchant app, through the merchant app. The distributor server 340 (or merchant 20, as noted above) also sends the long payment code to the banking app as shown at 512 and 412. At step 514, the consumer 10 logs onto the banking app, for example by providing a PIN when prompted to do so. The consumer 10 logging on causes the banking app to send the bank server 330 the long payment code as shown at 414.

Then, at step 516, the bank server 330 generates and sends a message 416 to the payment agent server 340 that includes the long payment code and requests the transaction details. At step 518, the payment agent server 340 validates the request, i.e. ensures that the request is from a registered bank. If successful, at step 520, the payment agent server 340 identifies the Pay By Bank App® payment from memory using the long payment code it has just received as an identifier, retrieves the transaction details and sends them to the bank server 330 as shown by message 420. The bank server 330 will then provide the transaction details 422 to the banking app running on the consumer mobile device 310, as shown at step 522.

The transaction details are displayed to the consumer 10 at step 524. For example, the merchant 20 may be identified and the transaction amount may be provided. The consumer 10 may then authorize the transaction such that an authorization message 426 is sent to the bank server 330 at step 526. The authorization message 426 will also include the transaction details and the long payment code. If the consumer 10 declines the transaction, the consumer mobile device 310 sends a decline message to the bank server 330.

Assuming the transaction has been authorized by the consumer 10, the bank server 330 takes this as authority to arrange a push payment to the merchant 20 identified in the transaction details. The bank server 330 then performs its own authorization by checking that sufficient funds are available to cover the transaction amount specified in the transaction details. If the bank server 330 can authorize the transaction, the bank server 330 generates a push payment 430 at step 530 using the transaction details including the amount and the merchant identifier contained in the transaction details. The push payment effectively pushes money from the consumer's bank account into the merchant's account held by the distributor 40. The merchant account may be determined from the merchant identifier contained in the transaction details, either directly or indirectly for example via a look-up table.

At 532, the bank server 330 generates and sends a payment confirmation 432 to the payment agent server 340 (or a decline notice if the consumer 10 declined the transaction at step 528). This payment confirmation 432 includes the long payment code and the transaction details. The payment agent server 340 validates the payment confirmation at step 534 by validating the bank 20 sending the confirmation 432 and ensuring it carries a valid long payment code. Optionally, the payment agent server 340 may generate and send an acknowledgement to the bank server 330. The payment agent server 340 then generates and sends to the distributor server 340 a payment confirmation and an acknowledgement 436 as shown at steps 536 and 538. The payment confirmation and acknowledgement 436 both include the long payment code and the transaction details.

The distributor server 340, in turn, sends the payment confirmation 440 to the merchant server 320 for display to the merchant 20 so that the merchant 20 can fulfil the purchase if authorized or void the transaction if declined, as shown at 540. The merchant 20 may be identified by the merchant identifier contained in the transaction details. The merchant server 320 acknowledges the confirmation 440 by sending message 442 to the distributor server 340 at step 542. The distributor server 340 returns an acknowledgement 444 to the payment agent server 350 at step 544.

Optionally, the distributor server 340 may send an acknowledgement to the consumer mobile device 310 for display to the consumer 10 on the banking app. The banking app may display the merchant 20, the transaction amount and a message either to confirm that the transaction has been made or that the transaction has been voided. This step 546 may also see the webpage provided on the consumer mobile device 310 by the distributor server 340 refresh to display a payment successful confirmation (or notice that the transaction was declined), and may also redirect back to a webpage provided by merchant server 320 that may also confirm the transaction was authorized or declined, and may confirm that the items purchased have been released for delivery (or the services purchased will be provided). The consumer may then log out of the mobile banking app as shown at step 548.

Figure 6:
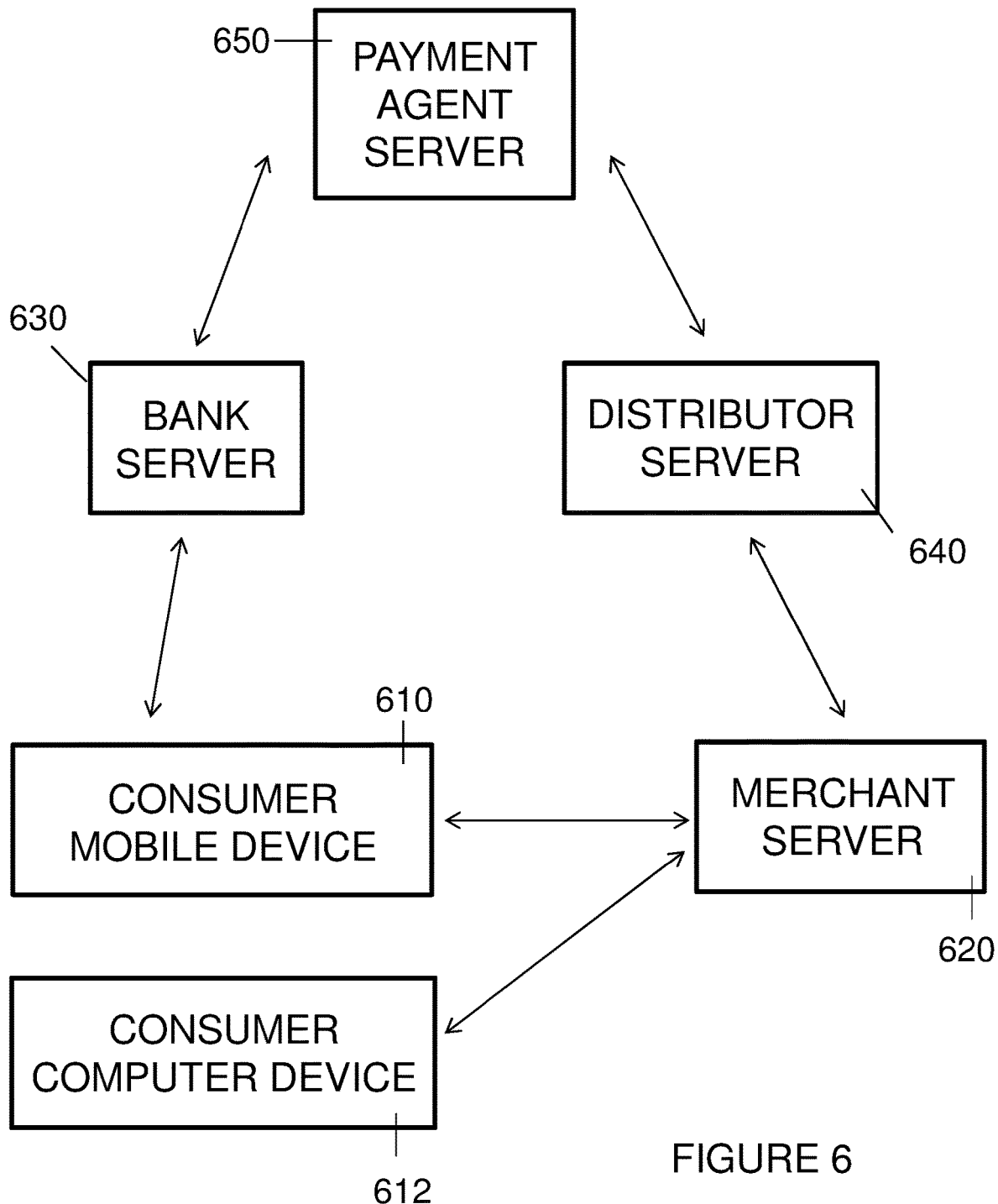
FIG. 6 is a schematic representation of devices participating in a tokenized transaction according to another embodiment of the present disclosure.

FIG. 6 shows an arrangement of devices participating in a tokenized transaction according to a second embodiment of the present disclosure. FIG. 6 broadly has similarities to FIG. 3 but, in this example, the consumer 10 is shopping on a merchant's website provided by the merchant's server 620 using a first computing device 612 such as a desktop computer or a laptop computer. The consumer computer device 612 may or may not be a mobile computer device. However, the consumer 10 also has a second computer device which, in this exemplary embodiment, is a mobile device 610 such as a tablet or smart phone, and which is used to authorize tokenized transactions.

Figure 7:
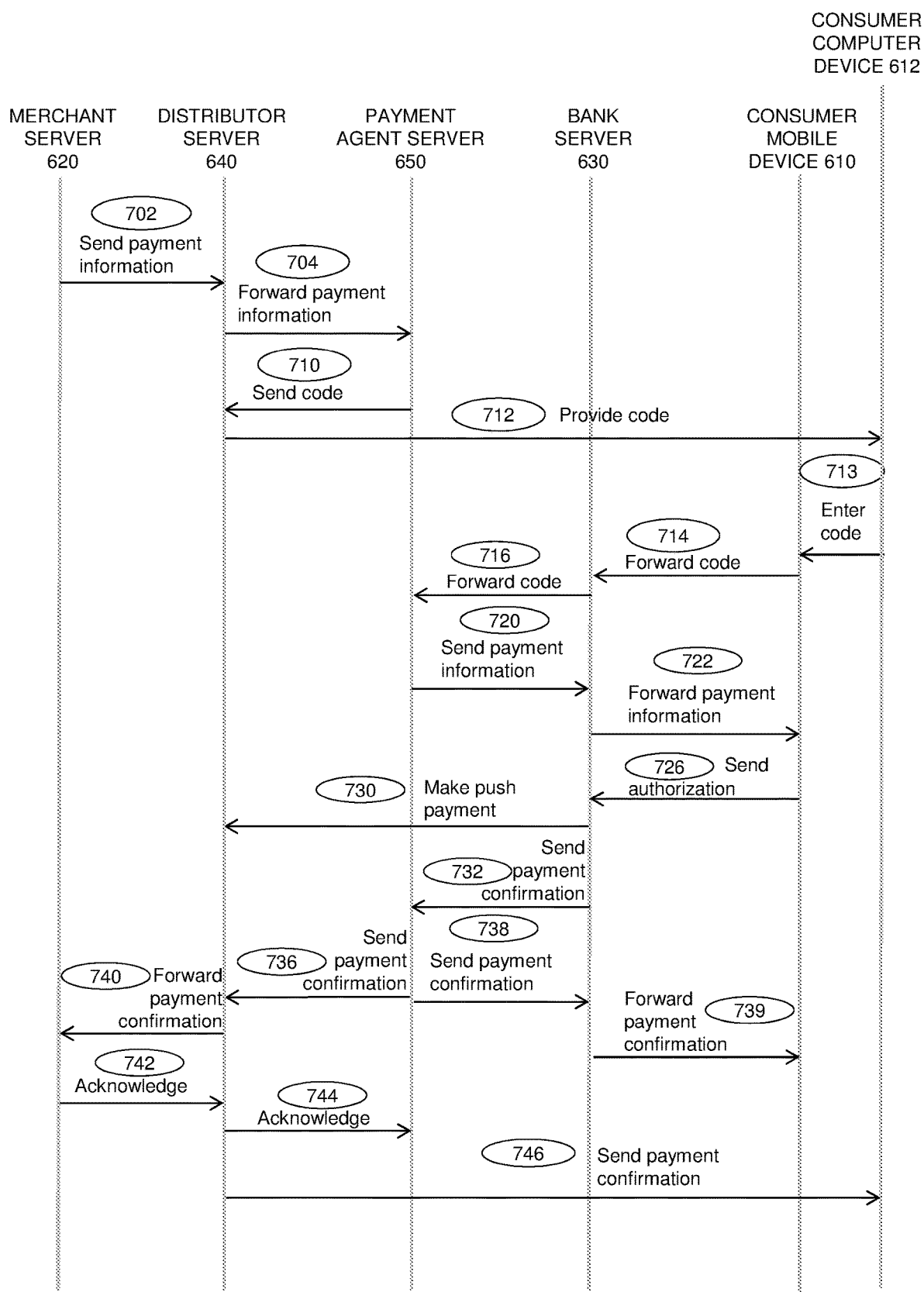
FIG. 7 is a schematic representation of the messages sent during a tokenized transaction according to an embodiment of the present disclosure.
Figure 8A:
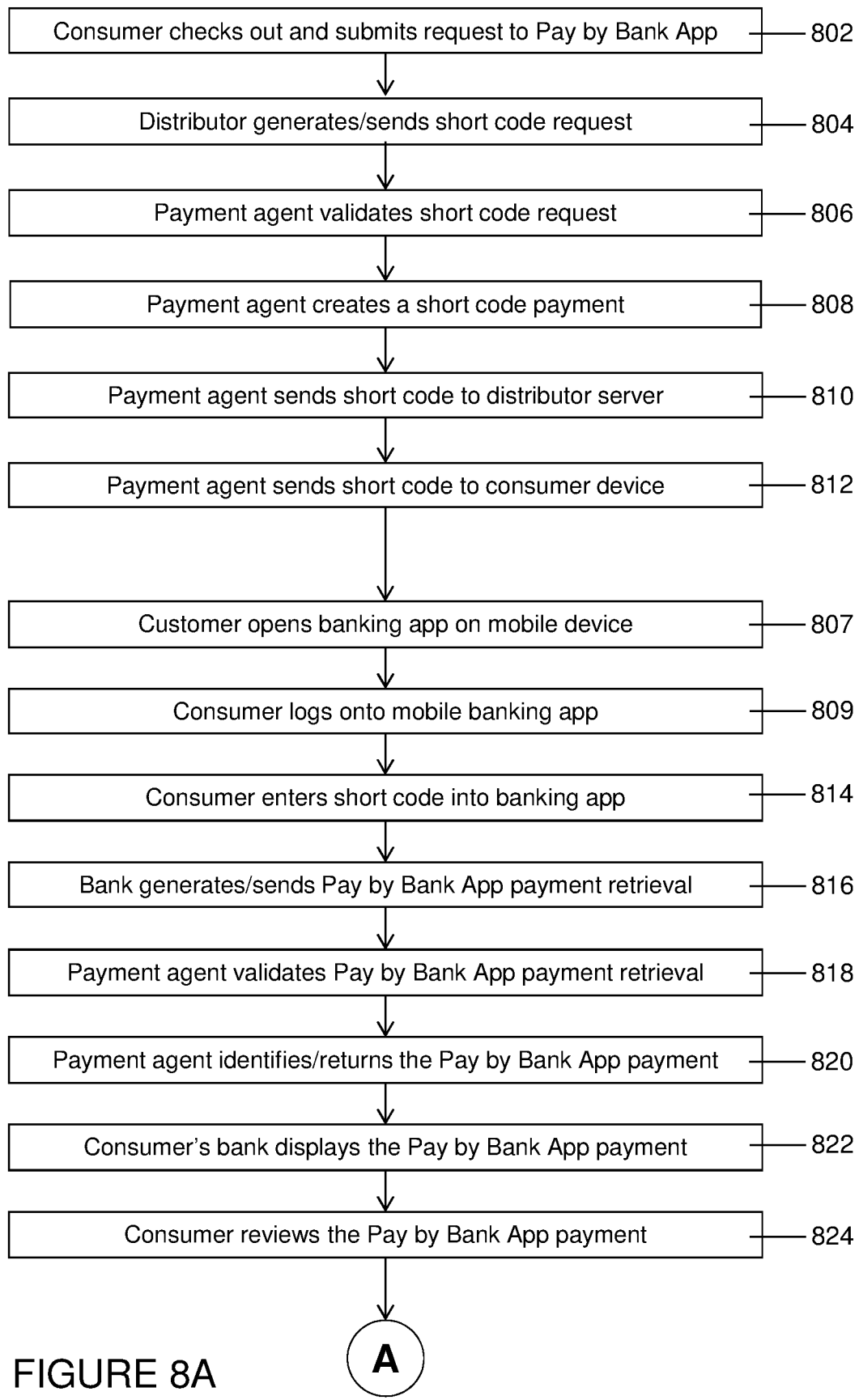
FIGS. 8A and 8B are is a schematic representation of the steps in the tokenized transaction of FIG. 7.
Figure 8B:
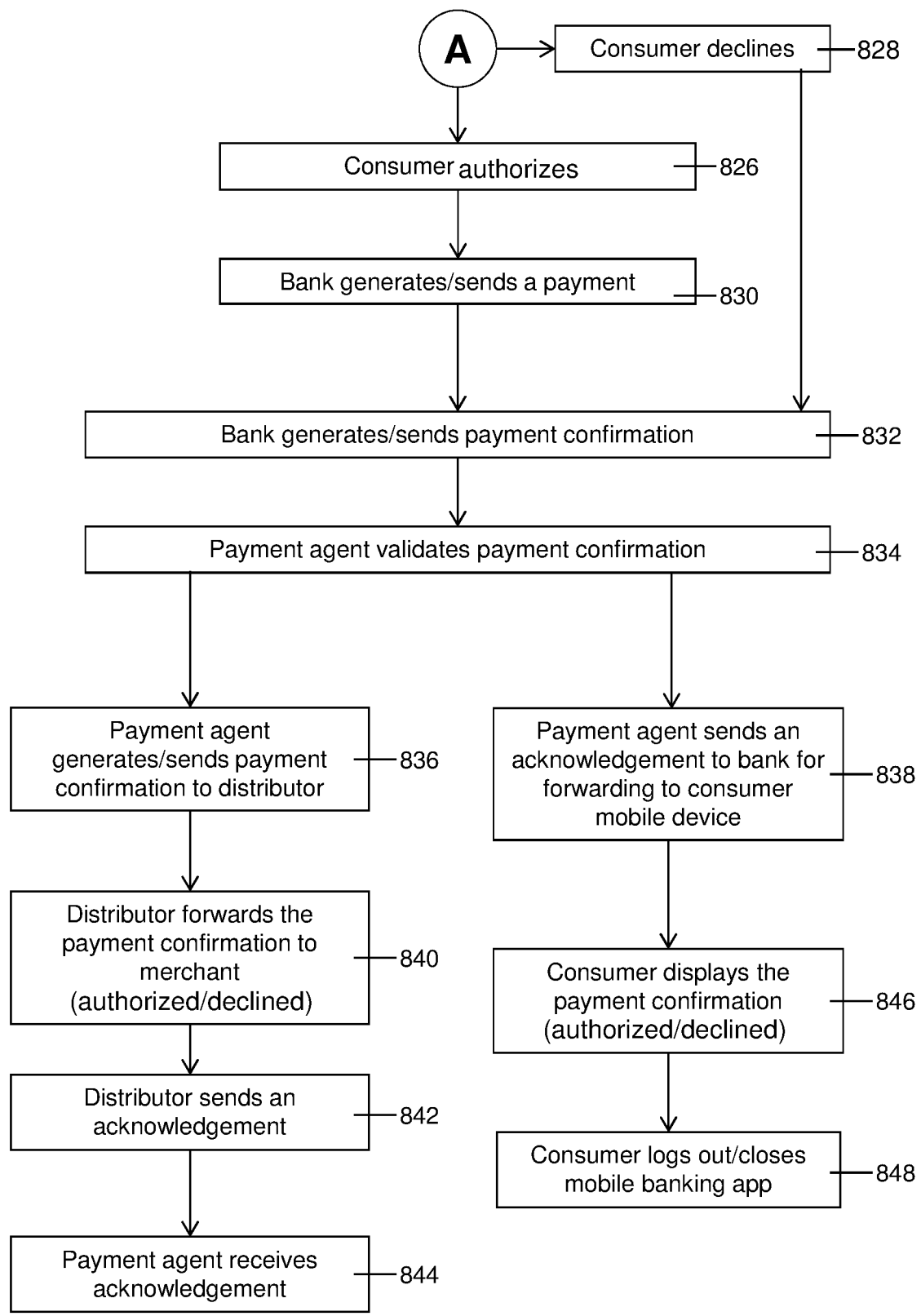

FIGS. 8A and 8B show the steps performed in the tokenized transaction scheme of the second embodiment of the present disclosure, and FIG. 7 shows the messages sent during the method. FIGS. 7, 8A, and 8B broadly correspond to FIGS. 4 and 5. Steps 802, 804, 806, 808, 810, and 812 and messages 702, 704, 710, and 712 correspond to steps 502 to 510 and messages 502 to 512 respectively and so will not be described in detail again. In this embodiment, the consumer 10 is using the consumer computer device 612 to shop and so uses this device 612 to proceed to the checkout webpage provided by the distributor server 640. At step 712, the distributor server 340 updates the checkout webpage to display a short payment code that has been requested by the distributor server 640 and provided by the payment agent server 650.

At step 807, the consumer 10 launches a banking app resident on the consumer mobile device 610, and then logs onto the banking app at step 809. The banking app may then be used by the consumer 10 to indicate that a Pay By Bank App® payment is required. This causes the banking app to prompt the consumer 10 to enter the short payment code as shown at 713 and 814.

As noted above, a short payment code is used in this embodiment because the consumer 10 must enter this payment code manually, as compared to the long payment code used in the first embodiment. It will be appreciated that use of a short code is less secure, but does not place too onerous a requirement of the consumer 10 who must enter the code manually and also carries a reduced risk of the consumer 10 typing the payment code incorrectly. The short payment code and/or the long payment code may be alphanumeric, alphabetic or numeric. Entering the short payment code causes the consumer mobile device 610 to send the short payment code to the bank server 630 as shown at 714.

The remainder of the method continues in much the same way as has been previously described for the first embodiment and so only a short summary is provided here. At step 816, the bank server 630 generates and sends a message 716 to obtain the transaction details. At step 818, the payment agent server 650 validates the payment retrieval. At step 820, the payment agent server 650 retrieves the transaction details using the short payment code it has just received, and sends them 720 to the bank server 630. The bank server 630 will then provide the transaction details 722 to the banking app running on the consumer mobile device 610, as shown at step 822.

The transaction details are displayed to the consumer 10 on the consumer mobile device at step 824 for the consumer 10 to authorize 826 or decline 828. Where the transaction has been authorized 726, the bank server 630 takes this as authority to arrange 830 a push payment 730 to the merchant 20 identified in the transaction details. At 832, the bank server generates and sends a payment confirmation 732 to the payment agent server 640 (or a decline notice if the consumer 10 declined the transaction). The payment agent server 640 validates the payment confirmation at step 834 and then generates and sends a payment confirmation 736 to the distributor server 640 at step 836. In contrast to the first embodiment, the payment agent server 640 generates and sends an acknowledgement 738 to the bank server 630 at step 838. The acknowledgement 738 includes the short payment code and the transaction details. This step 838 is optional and may be omitted.

The distributor server 640, in turn, sends 840 the payment confirmation 740 to the merchant server 620 for display to the merchant 20 so that they can fulfil the purchase. The distributor server 340 also returns 842 an acknowledgement 744 to the payment agent server 650 at step 844. In addition, at step 846, the distributor server 640 sends the acknowledgement 746 to the consumer computer device 612 for display to the consumer 10. This step 846 sees the webpage provided by distributor server 640 refresh to display a payment successful confirmation (or notice that the transaction was declined), and may also redirect back to a webpage provided by merchant server 620 that may also confirm 742 the transaction was authorized or declined, and may confirm that the items purchased have been released for delivery (or the services purchased will be provided).

When the payment agent server 650 send the acknowledgement 738 to the bank server 630, the bank server 630 then forwards the acknowledgement as payment acknowledgement 739 which is received by the banking app running on the consumer mobile device 610. At 846, the banking app displays the merchant, the transaction amount and a message either to confirm that the transaction has been made or that the transaction has been voided. The consumer 10 may then log out of the mobile banking app as shown at step 848.

Those skilled in the art will appreciate that variations may be made to the above embodiments without departing from the scope of the disclosure that is defined by the appended claims.

For example, FIGS. 1, 3 and 6 show the transaction to involve five participants, namely the consumer 10, the merchant 20, the bank 30, the distributor 40 and the payment agent 50. However, the transaction may involve a greater or lesser number of participants.

Fewer participants may be involved where a participant assumes more than one role within the transaction. For example, the bank 30 may also act as the distributor 40, for example where the bank 30 is responsible for managing the accounts held by both the consumer 10 and the merchant 20. Alternatively, the bank 30 may act as the payment agent 50. In addition, the merchant 20 or the consumer 10 may be a bank 30. As an example, a consumer 10 may wish to use a tokenized transaction scheme to arrange a payment to pay a credit card bill relating to a credit card provided by their bank 30. In this example, the bank 30 will also act as the merchant 20 and most likely will also act as the distributor 40. It will be readily apparent how the transaction schemes above may be adapted when a participant adopts more than one role in the transaction. Where messages are sent between parties, but the roles are provided by a common participant, the message need not be sent nor an acknowledgment returned. Where another participant sits between the roles provided by a single participant, messages may be simply bounced back and forth between the two participants. This would be the case where the bank 30 also fulfils the role of the distributor 40 such that messages may be bounced back and forth with the payment agent 50.

A greater number of participants may be involved in the transaction. The merchant may include more than a single party. By way of example, the merchant may provide a "marketplace" website for different traders to present their goods and/or services: payment may then be effected directly to the trader and the distributor may be related to the trader rather than to the merchant. Also, the distributor 40 may have an associated financial institution such as a bank or building society that handles accounts for the distributor. Other intermediaries may be involved, and these intermediaries may simply forward messages sent during the transaction, or may forward messages after performing some operation on the messages, for example to perform a check or to add further information to the messages. In this context, forwarding may include sending new messages containing the same information as was contained in the messages as set forth in the foregoing description and in the following claims. The intermediaries may store copies of the messages or extract information from the messages, for example because of regulatory or auditing purposes. Also, other interested parties may receive information relating to the transaction. For example, these other interested parties may be copied messages sent during the transaction, or may be sent information relating to the transactions. These interested parties may return acknowledgements.

The invention claimed is:

1. A computer-implemented method of facilitating a transaction between a payer and a payee using a push payment, the method comprising:
(i) a computing apparatus associated with a payee sending a request for a payment identification code to the computing apparatus of a payment agent, wherein the request for the payment identification code comprises payment information identifying the payee and an amount to be paid;
(ii) the computing apparatus of the payment agent generating the payment identification code to be associated with the payment information that is unique, thereby allowing the payment to be unambiguously identified, storing the payment identification code with the associated payment information, and providing the payment identification code to the computing apparatus associated with the payee;
(iii) the computing apparatus associated with the payee providing the payer with the payment identification code;
(iv) a computing apparatus of the payer receiving the payment identification code;
(v) the computing apparatus of the payer sending the payment identification code to a computing apparatus of a financial institution, wherein the financial institution is the financial institution associated with the payer for making payments from the payer;
(vi) the computing apparatus of the financial institution sending the payment identification code to the computing apparatus of the payment agent;
(vii) the computing apparatus of the payment agent receiving the payment identification code, using the payment identification code to retrieve the previously stored payment information associated with the payment identification code, and sending the payment information associated with the payment identification code to the computing apparatus of the financial institution;
(viii) the computing apparatus of the financial institution sending the payment information and the payment identification code to the computing apparatus associated with the payer;
(ix) the computing apparatus associated with the payer displaying the payment information for authorization by the payer, receiving an authorization from the payer, and sending a request to pay message including the payment identification code to the computing apparatus of the financial institution; and
(x) the computing apparatus of the financial institution arranging for a push payment from the payer to the payee.

2. A computer-implemented method of facilitating a transaction between a payer and a payee using a push payment, the method comprising:
(a) a computing apparatus associated with a payer sending a request for a payment identification code to a computing apparatus of a financial institution, wherein the financial institution is the financial institution associated with the payer for making payments from the payer;

(b) the computing apparatus of the financial institution sending a request for the payment identification code to a computing apparatus of a payment agent;

(c) the computing apparatus of the payment agent generating the payment identification code that is unique, thereby allowing the payment to be unambiguously identified, storing the payment identification code with an indication of the requesting financial institution, and providing the payment identification code to the computing apparatus of the financial institution;

(d) the computing apparatus of the financial institution sending the payment identification code to the computing apparatus associated with the payer;

(e) the payer providing the payee with the payment identification code;

(f) a computing apparatus of the payee receiving the payment identification code;

(g) the computing apparatus of the payee sending the payment identification code and payment information identifying the payee and an amount to be paid to the computing apparatus of the payment agent;

(h) the computing apparatus of the payment agent storing the payment information with the payment identification code, using the payment identification code to retrieve the previously stored indication of the requesting financial institution, and sending the payment information associated with the payment identification code to the computing apparatus of the financial institution;

(i) the computing apparatus of the financial institution sending the payment information and the payment identification code to the computing apparatus associated with the payer;

(j) the computing apparatus associated with the payer displaying the payment information for authorization by the payer, receiving an authorization from the payer, and sending a request to pay message including the payment identification code to the computing apparatus of the financial institution; and (k) the computing apparatus of the financial institution arranging for a push payment from the payer to the payee.

3. The method of claim 1, wherein the computing apparatus associated with the payee is a computing apparatus of a distributor associated with the payee for collecting payments due to the payee.

4. The method of claim 1, wherein step (iv) further comprises the payer manually entering the payment identification code into the computing apparatus associated with the payer, and wherein the payment identification code is an alphanumeric code comprising six characters or fewer.

5. The method of claim 1, wherein steps (ii) and (iv) comprise the computing apparatus associated with the payee automatically transferring the payment identification code to the computer apparatus associated with the payer, and wherein the payment identification code is an alphanumeric code comprising six characters or more.

6. The method of claim 1, wherein step (x) comprises one of the computing apparatus of the financial institution arranging for a push payment directly to the payee and the computing apparatus of the financial institution arranging for a push payment indirectly to the payee via the distributor.

7. The method of claim 1, wherein step (viii) further comprises the computing apparatus of the financial institution updating the stored payment identification code with the payment information, thereby associating the payment information with the payment identification code, wherein step (x) further comprises using the payment identification code received from the computing apparatus associated with the payer to retrieve the previously stored payment information and arranging for the push payment to cover the payment amount, and wherein the payee and the payment amount are determined from the payment information retrieved by the computing apparatus of the financial institution.

8. The method of claim 1, wherein step (ix) comprises the computing apparatus associated with the payer sending a request to pay message including the payment identification code and the transaction details to the computing apparatus of the financial institution, and wherein step (x) further comprises the computing apparatus of the financial institution arranging for a push payment from the payer to the payee identified in the payment information received from the computing apparatus associated with the payer to cover the amount to be paid indicated in the received payment information.

9. The method of claim 1, further comprising:
sending a payment confirmation message to the computing apparatus associated with the payer; and
the computing apparatus associated with the payer displaying a confirmation that the payment has been made.

10. The method of claim 1, further comprising:
sending a payment confirmation message to the computing apparatus associated with the payee.

11. The method of claim 10, further comprising:
sending a payment confirmation message to the computing apparatus of the distributor;
the computing apparatus of the distributor sending a payment confirmation message to the computing apparatus associated with the payee; and
the computing apparatus associated with the payee displaying a confirmation that the payment has been made.

12. The method of claim 10, wherein sending the payment confirmation message comprises the computing apparatus of the financial institution sending a payment confirmation message to the computing apparatus associated with the payee via the computing apparatus of the payment agent.

13. The method of claim 1, wherein step (ix) further comprises the computing apparatus associated with the payer receiving at least one of a PIN, a password, and a biometric input by the payer to authorize the transaction.

14. The method of claim 13, wherein step (ix) further comprises the computing apparatus associated with the payer displaying the payment information for authorization by the payer, and the payer authorizing the transaction by entering at least one of a PIN, a password, and inputting biometric information.

15. The method of claim 13, wherein step (ix) further comprises the computing apparatus of the payer receiving the payment information, launching an app on the computing apparatus associated with the payer that requires the payer to log into the app, the payer logging into the app, and, in response, the app causing the computing apparatus associated with the payer to display the payment information for authorization by the payer, wherein the payer logs into the app by providing a PIN or password or by inputting biometric information.

* * * * *